UNITED STATES PATENT OFFICE.

THOMAS J. JUZEK, OF ELGIN, ILLINOIS.

LOCK-NUT AND BOLT.

1,119,613. Specification of Letters Patent. Patented Dec. 1, 1914.

Application filed July 3, 1914. Serial No. 848,786.

*To all whom it may concern:*

Be it known that I, THOMAS J. JUZEK, a citizen of the United States, residing at Elgin, in the county of Kane and State of Illinois, have invented certain new and useful Improvements in Lock-Nuts and Bolts, of which the following is a specification.

The present invention has reference to certain improvements in lock nuts and bolts of that type in which a cotter pin or the like is inserted through a hole in the end portion of the bolt, said cotter pin coöperating with slots or projections on the nut in order to prevent rotation of the same. In this class of bolt the cotter hole is covered over or hidden by the projections or lugs of the nut as the nut is rotated, and in order to insert the cotter pin it is necessary to bring the nut into exactly the proper position so that the cotter hole will register with the slots or openings of the nut. On account of the above mentioned feature, this class of lock nut is open to the objection that some times it is very difficult to register up the slots of the nut with the cotter hole of the bolt, and until this is done the cotter pin cannot be set into place. This difficulty or objection is all the more pronounced when the bolt is used in locations where it cannot be readily manipulated.

One of the objects of the present invention is to so form the end portion of the bolt that the operator will have an indication as to the direction in which the cotter hole extends, so that when looking at the ends of the bolt and nut the operator will know when a pair of slots of the nut has been brought into registry with the hole in the bolt; and so that the operator can ascertain the direction in which the cotter pin should be inserted.

Another object of the invention is to so form the aforementioned indicating means that said means may be used for holding the bolt against rotation when the nut is being tightened up or loosened. It frequently happens that the nut and bolt thread together so tightly that some extraneous force must be applied to the bolt to retain the same against rotation.

One of the objects of the present invention is to so form the indicating means that it may be used to retain the bolt against rotation under these circumstances, or if desired, to use said indicating means for the purpose of rotating the bolt.

Other objects and uses will appear from a detailed description of the invention which consists in the features of construction and combinations of parts hereinafter described and claimed.

Figure 1:
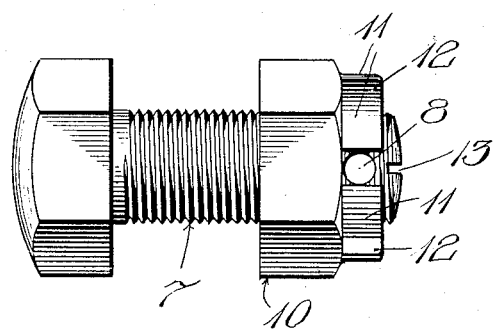
Figure 2:
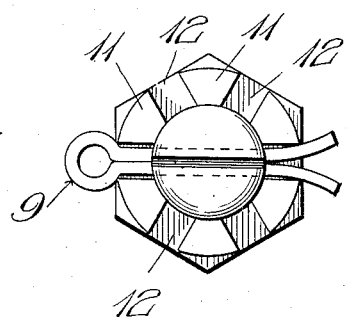
Figure 3:
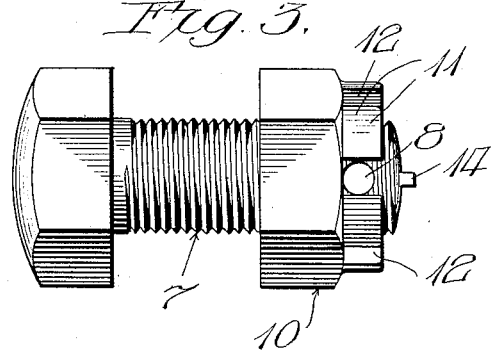
Figure 4:
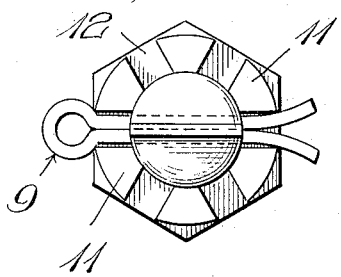
Figure 5:
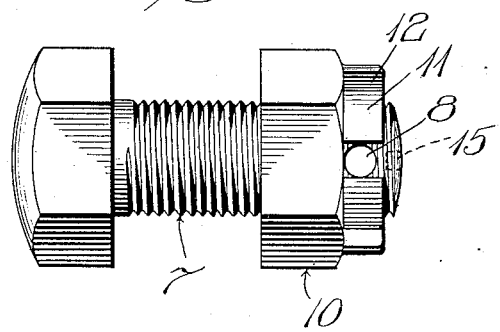
Figure 6:
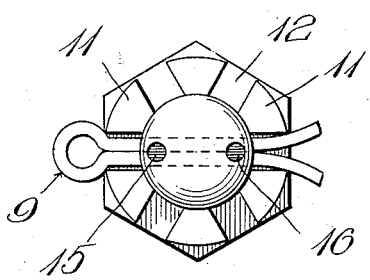

In the drawings: Figure 1 shows a side view of a bolt to which the nut has been applied, the cotter pin hole and indicating means facing the observer; Fig. 2 is an end view corresponding to Fig. 1, a cotter pin having been inserted in place; Figs. 3 and 5 are side views of modified forms of bolts; and Figs. 4 and 6 are end views corresponding to the views of Figs. 3 and 5 respectively.

In each of the three illustrated forms the numeral 7 designates the bolt. In each case the bolt is provided with a cotter pin hole 8 adjacent to its threaded end, said holes being for the reception of cotter pins or the like 9. The illustrated form of lock nut 10 is provided with a plurality of outstanding lugs or the like 11 between which are the slots 12. The lugs 11 are so formed that the slots 12 stand in diametrically opposite pairs, so that as the nut is rotated the pairs of slots will successively come opposite to the ends of the cotter hole 8 to allow the cotter pin to be set into place as illustrated in Figs. 2, 4, and 6.

It will be observed that the locking function between the lugs 11 and the cotter pin will not be secured except when the nut stands at such a position on the bolt that the hole 8 is at least partially covered by the lugs 11 in the rotation of the nut. Ordinarily the nut will stand or be threaded into such a position that the lugs 11 will completely cover over or hide the cotter hole as the nut is rotated. Under these circumstances the operator will not observe the cotter hole as the nut is rotated unless he happens to view the nut from such a position that the hole can be seen by looking through one of the slots 12 as the nut is rotated. If it is necessary for the operator to place the cotter pin while observing the end of the bolt it will be impossible for him to find the cotter pin hole and insert the cotter pin except as a matter of chance or by holding the end of the cotter pin seated within one of the slots and then rotating the nut for approximately one-half revolution. This operation is generally impracticable, particularly where the nut is to be drawn up tight.

In the arrangement shown in Figs. 1 and 2 I provide a slot 13 across the end of the bolt, and in alinement with the cotter pin hole. This slot may be readily viewed from the end of the bolt as shown in Fig. 2, so that the operator can readily ascertain the direction of the hole for the purpose of properly alining a pair of slots with it, and then for the purpose of inserting the cotter pin. In this form of construction the slot 13 may be also used for the reception of a screw driver or other tool for the purpose of holding the bolt in case the nut should bind with undue friction. In the arrangement shown in Figs. 3 and 4 the indicating means takes the form of a rib or the like 14 extending in the direction of the cotter hole and taking the place of the slot 13 of the previous arrangement. On the other hand, in the arrangement shown in Figs. 5 and 6 the indicating means takes the form of a pair of holes or sockets 15 and 16 which are formed in the bolt over the ends of the cotter hole, the holes 15 and 16 likewise giving an indication and serving as a means to prevent rotation of the bolt.

I am aware of the fact that lock nuts have long been used in association with bolts to which they are locked by means of cotter pins or the like, and I do not claim this broad combination as a matter of invention with me. But I do claim the provision of indicating means on the end of the bolt for giving an indication as to the direction in which the cotter hole extends, and also such an indicating means as the foregoing when the same is peculiarly adapted for use in connection or combination with a proper tool to prevent rotation of the bolt.

I claim:

1. As a new article of manufacture a bolt having a cotter hole formed through its end portion and having a slot formed in its end portion parallel to and in alinement with the cotter hole, substantially as and for the purpose set forth.

2. As a new article of manufacture a bolt having a cotter hole extending through its end portion and having visual means on its extreme end for indicating the position and direction of the cotter hole, substantially as and for the purpose set forth.

3. The combination with a bolt having a cotter hole extending through its end portion and visual means on its extreme end for indicating the position and direction of the cotter hole, of a nut threaded onto the bolt, said nut being provided with a plurality of outstanding lugs having diametrically opposite slots therebetween for the reception of a cotter pin which extends through the cotter hole, substantially as and for the purpose set forth.

THOMAS J. JUZEK.

Witnesses:
THOMAS A. BANNING, Jr.,
FRANCES M. FROST.